(No Model.)
R. MEACHAM.
FAN ATTACHMENT FOR VEHICLES.
No. 320,082. Patented June 16, 1885.
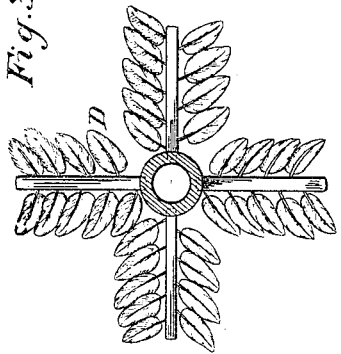
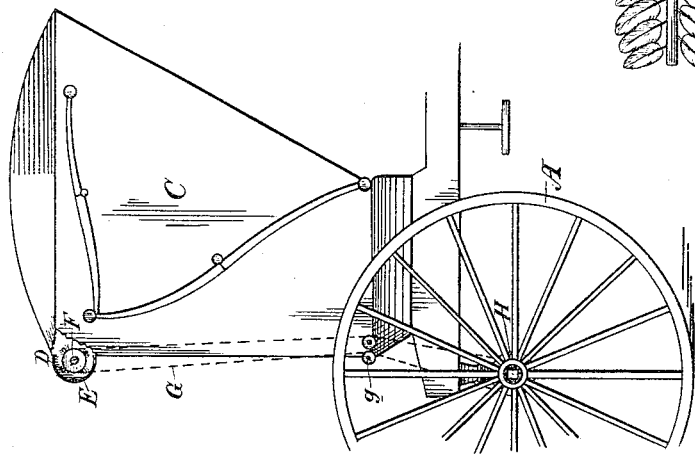
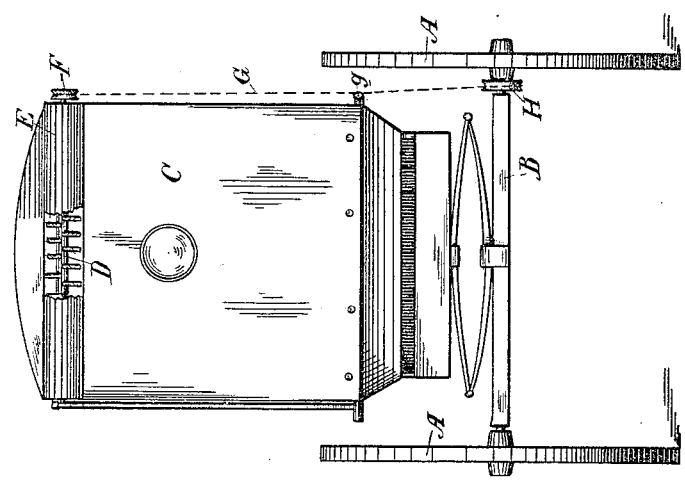
Witnesses:
Geo. H. Strong.
Inventor
R. Meacham
By Dewey & Co.
Attorneys

UNITED STATES PATENT OFFICE.

RANDALL MEACHAM, OF CHICO, CALIFORNIA.

FAN ATTACHMENT FOR VEHICLES.

SPECIFICATION forming part of Letters Patent No. 320,082, dated June 16, 1885.

Application filed April 16, 1885. (No model.)

*To all whom it may concern:*

Be it known that I, RANDALL MEACHAM, of Chico, Butte county, State of California, have invented an Improvement in Fan Attachments for Wheeled Vehicles; and I hereby declare the following to be a full, clear, and exact description of the same.

My invention relates to a new and useful attachment for buggies, carriages, and other vehicles intended for general riding purposes; and my invention consists in a fan mounted in the top of the vehicle and operated by power transmitted from the wheel, as I shall hereinafter fully describe.

The object of my invention is to make riding in warm weather and over dusty roads more pleasant, by creating a constant breeze or circulation of air within the vehicle.

Referring to the accompanying drawings, Figure 1 is a rear elevation of a vehicle, showing my attachment. Fig. 2 is a side elevation of same. Fig. 3 is a vertical cross-section of the fan.

A are wheels, and B is an axle, of a vehicle, which may here be called an ordinary buggy, of which said axle and wheels are the rear ones.

C is the buggy-top. Mounted transversely in bearings in the rear upper portion of the top is a fan, D, which may be made in any suitable manner—as shown, for example, in Fig. 3—and consisting of a hub-shaft with radial arms provided with wings. I prefer to mount the fan within a semi-cylindrical or curved cross-casing, E, formed at the back of the top, whereby said fan is kept free from dust, &c. The back of the top in front of the fan is open, as shown in Fig. 2, to permit the free circulation and discharge of air. Upon the end of the fan-shaft is a grooved face-pulley, F, from which an endless belt, G, extends to a grooved face-pulley or sheave, H, on the inner end of the hub of the wheel, whereby power is transmitted from said wheel to rotate the fan, and thus keep up a circulation of air. The belt is directed by a suitable guide, *g*, on the vehicle.

Having thus described my invention, what I claim as new, and desire to secure by Letters Patent, is—

1. The combination, with the top C of a vehicle, of a curved open-front casing, E, across its rear, and a rotating fan, D, mounted within the casing, substantially as described.

2. The combination, with the top of a vehicle, of a curved casing, E, at the rear, a fan mounted in said casing, a pulley on the fan-shaft, a pulley on the wheel-hub, a belt, and the guides *g*, substantially as and for the purpose described.

In witness whereof I have hereunto set my hand.

RANDALL MEACHAM.

Witnesses:
JULIUS H. BEHME,
H. H. FRYE.